(12) United States Patent
Härwell et al.

(10) Patent No.: US 9,369,663 B2
(45) Date of Patent: Jun. 14, 2016

(54) REMOTE-CONTROLLED RECORDING

(75) Inventors: Olof Härwell, Stockholm (SE); Farjola Zaloshnja, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 310 days.

(21) Appl. No.: 14/003,682

(22) PCT Filed: Mar. 10, 2011

(86) PCT No.: PCT/EP2011/053629
§ 371 (c)(1),
(2), (4) Date: Sep. 6, 2013

(87) PCT Pub. No.: WO2012/119659
PCT Pub. Date: Sep. 13, 2012

(65) Prior Publication Data
US 2014/0186011 A1  Jul. 3, 2014

(51) Int. Cl.
| | |
|---|---|
| *H04N 5/76* | (2006.01) |
| *H04N 5/782* | (2006.01) |
| *H04N 21/4227* | (2011.01) |
| *H04N 21/433* | (2011.01) |
| *H04N 21/436* | (2011.01) |
| *H04N 21/466* | (2011.01) |
| *H04N 21/4788* | (2011.01) |
| *H04N 21/6543* | (2011.01) |

(52) U.S. Cl.
CPC .................. *H04N 5/76* (2013.01); *H04N 5/782* (2013.01); *H04N 21/4227* (2013.01); *H04N 21/4334* (2013.01); *H04N 21/43622* (2013.01); *H04N 21/4668* (2013.01); *H04N 21/4788* (2013.01); *H04N 21/6543* (2013.01)

(58) Field of Classification Search
CPC ... H04N 5/4403; H04N 5/765; H04N 21/458; H04N 21/47202; H04N 21/47214; H04N 21/4828; H04N 7/17318
See application file for complete search history.

(56) References Cited

U.S. PATENT DOCUMENTS

| | | | | |
|---|---|---|---|---|
| 6,314,573 | B1 * | 11/2001 | Gordon | H04N 7/17318 348/E7.071 |
| 2009/0319603 | A1 | 12/2009 | Baldwin et al. | |
| 2010/0332655 | A1 * | 12/2010 | Kim | H04N 5/765 709/224 |

FOREIGN PATENT DOCUMENTS

| | | |
|---|---|---|
| EP | 2251829 A2 | 11/2010 |
| EP | 2265007 A2 | 12/2010 |

* cited by examiner

*Primary Examiner* — Huy T Nguyen
(74) *Attorney, Agent, or Firm* — Patent Portfolio Builders, PLLC (57) ABSTRACT

A remote-controlled recording of selected linear media, e.g. a TV program, on a Recording device (3) belonging to a first subscriber (Subscriber A). The recording is remote-controlled from a Media Management server (1), e.g. an IPTV Backend, and initiated from a User equipment (2) belonging to a different subscriber (Subscriber B), wherein Subscriber B must be authorized by Subscriber A to access the Recording device. The authorization is checked by the Media management server, e.g. from a Friends list or an Access list stored in the Media management server, or in an external social network-node.

10 Claims, 12 Drawing Sheets

Method for a PVR:

Fig. 7

Method for a UE:

REMOTE-CONTROLLED RECORDING

TECHNICAL FIELD

The present invention relates to a method for a Media management server, for a Recording device, and for a User equipment of remote-controlled recording of selected linear media. The invention also relates to a Media management server, to a Recording device, and to a User equipment.

BACKGROUND

An IPTV (Internet Protocol Television) service is typically delivered to an end-user device from an IPTV Backend and via a set-top box, and an IPTV service may comprise e.g. linear television (i.e. real-time television). The set-top box is capable of receiving a media stream of the television service from an IPTV feed, e.g. a satellite, a terrestrial aerial or a cable, and display on a suitable display device, e.g. a TV-screen or a personal computer.

A home network or an office network may comprise several interconnected electronic devices, e.g. personal computers, mobile phones, recording devices, set-top-boxes and gaming consoles. Electronic devices within a conventional LAN (Local Area Network) may communicate with each other e.g. using the HTTP (HyperText Transfer Protocol).

Alternatively, in a DLNA (Digital Living Network Alliance) network, the electronic devices are adapted to communicate according to the DLNA-standard, which allows electronic devices to communicate with other DLNA-compatible devices within the same DLNA network without a complicated configuration process. However, the DLNA standard does not involve any end-user authentication.

A recording device, e.g. a DVR (Digital Video Recorder) or a PVR (Personal Video Recorder), is an electronic device or application software that is capable of recording video in a digital format and store on a disk drive or on any other local or networked storage device. Further, a set-top box with a recording and playback facility may also be denoted a DVR or a PVR. However, a conventional standardized DVR or PVR is not able to authenticate a user, and it is not possible to know which user that is controlling the DVR/PVR.

Nowadays, an end-user may want to share his/her experiences with other persons belonging to his/her social network, such as e.g. friends, family members, colleagues, or with friends on a social networking web-site, e.g. Facebook, even if the persons are not at the same place as the end-user. This may involve e.g. sharing the experience to view a linear TV program with a friend, but on different devices. Thus, a person watching a TV-program on a PC located in a the kitchen may want e.g. another family member to view the same TV-program on a TV screen located in the living room, and/or may want a Facebook-friend in another city to view the TV program on a suitable device in his/her own home.

However, the family member, friend or colleague may not be able to view the linear TV program at the time of broadcasting, e.g. since he/she is not at home, is not logged-in, or is busy. Further, even if the friend is at home and logged in, the friend may not have payed for viewing the TV program.

SUMMARY

It is an object of the embodiments described hereinafter to address at least some of the issues outlined above, and this object and others are achieved by the method and the arrangement according to the appended independent claims, and by the embodiments according to the dependent claims.

A first aspect of exemplary embodiments provides a method for a Media management server of remote-controlled recording of selected linear media on a Recording device belonging to a selected Subscriber A. The recording is initiated by a User equipment belonging to Subscriber B, i.e. to a different subscriber than said selected Subscriber A. The method comprises the Media management server performing the following:
  retrieving a listing of available linear media, and forwarding to the User equipment;
  sending a listing of subscribers associated with Subscriber B to the User equipment;
  receiving a command from the User equipment to remote-control a recording of the selected linear media on a Recording device belonging to the selected Subscriber A;
  determining if Subscriber B is authorized by Subscriber A to remote-control the Recording device, and
  sending a command to the Recording device to record the selected linear media, if Subscriber B is authorized.

The Media management server may further determine if the selected Subscriber A subscribes to the selected linear media, and send a request to the User equipment to accept a charge for the media, if Subscriber A does not subscribe to the selected media.

The Media management server may further allow a play-out of the selected recorded media, if receiving an acceptance from the User equipment, and lock the play-out of the selected recorded media until a payment is received, if receiving a rejection of the request from the User equipment.

A second aspect of exemplary embodiments provides a method for a Recording device connected to a Media management server of recording selected linear media. The Recording device belongs to Subscriber A, and the recording is remote-controlled from the Media management server, and initiated by a User equipment belonging to Subscriber B, i.e. to a different subscriber than Subscriber A. The method comprises the Recording device receiving a command from the Media management server to record a selected linear media, wherein the linear media and the recording device is selected from the User equipment, and detecting and recording the linear media.

The Recording device may further store the recorded media content in an encrypted or non-encrypted format, and the selected linear media may be received e.g. from a Linear media source.

A third aspect of exemplary embodiments provides a method for a User equipment, connected to a Media management server, of initiating a remote-controlled recording of selected linear media on a Recording device belonging to a selected Subscriber A. The User equipment belongs to Subscriber B, i.e. to a different subscriber than said selected Subscriber A, and the recording is remote-controlled by the Media management server. The method comprises the User equipment performing the following:
  browsing the Media management server for receiving and, displaying a listing of available linear media, and a listing of associated subscribers;
  receiving a user-input of a selected linear media and a selected Subscriber A, and
  sending a command to the Media management server to record the selected linear media on a Recording device belonging to the selected Subscriber A.

The User equipment may further receive and display a request from the Media management server to accept a charge for the selected linear media. Next, the User equipment may receive a user-input in response to the displayed request, the response accepting or rejecting the request, and send a corresponding response to the Media management server.

A fourth aspect of exemplary embodiments provides a Media management server connectable to a Recording device belonging to Subscriber A, and to a User equipment belonging to Subscriber B, e.g. to a different subscriber than Subscriber A. The Media management server is arranged to remote-control a recording of selected linear media on the Recording device, and the recording is initiated from the User equipment. The Media management server comprises the following units:
- a Retrieval unit configured to retrieve a listing of available linear media;
- a Sending unit configured to send the listing of available linear media and a listing of subscribers associated with Subscriber B to the User equipment;
- a Receiving unit configured to receive a command from the User equipment to remote-control a recording of selected linear media on a Recording device belonging to the selected Subscriber A;
- a Remote-control unit configured to determine if Subscriber B is authorized by Subscriber A to access the Recording device, and to send a command to the Recording device to record selected linear media, if Subscriber B is authorized by Subscriber A to access the Recording device.

The Media management server may further comprise a Storage unit configured to store listings of other subscribers associated with each subscriber, the listing comprising devices belonging to each of the associated subscribers, and the Storage unit may also be configured to store listings of other subscribers that are authorized to access a device of a subscriber.

The Media management server may be further configured to retrieve a listing of other subscribers that are associated with each subscriber, as well as a listing of other subscribers that are authorized to access a device of a subscriber, from a separate social network-node connected to the Media management server.

The Media management server may also comprise a Billing unit configured to determine if a subscriber subscribes to a selected media, and to charge a subscriber for a selected media.

A fifth aspect of exemplary embodiments provides a Recording device connectable to a Media management server and arranged to record linear media. The recording is remote-controlled from the Media management server and is initiated by a User equipment belonging to another subscriber and connected to the Media management server. The Recording device comprises the following units:
- a Receiving unit configured to receive a command from the Media management server to record a selected linear media, wherein the linear media and the Recording device is selected from the User equipment, and
- a Recording unit configured to detect and record the selected linear media.

The Recording device may further comprise a Linear Media-receiver configured to receive a media stream from a Linear media source, and a Media storage unit configured to store recorded media in an encrypted or non-encrypted format.

A sixth aspect of exemplary embodiments provides a User equipment connectable to a Media management server and arranged to initiate a remote-controlled recording of selected linear media on a Recording device belonging to a selected other subscriber. The recording is remote-controlled from the Media management server, and the User equipment comprises the following units:
- a Browsing unit configured to browse the Media management server for receiving a listing of available linear media, and a listing of associated other subscribers;
- a Display unit configured to display said listings;
- a User-input unit configured to receive a user input selecting a linear media and an associated subscriber from the listings;
- a Sending unit configured to send a command to the media management server to record the selected linear media on a Recording device belonging to the selected other subscriber.

The User equipment may be further arranged to receive and display a request from the Media management server to accept a charge for a selected linear media. It may also be arranged to receive a user input in response to the request, and to send a corresponding response to the request to the Media management server, the response accepting or rejecting the request.

It is an advantage with exemplary embodiments that an end-user can enable a friend to view a selected linear TV program, even if the friend is not able to watch the TV program at the time of broadcasting, and even if the friend does not subscribe to the channel showing the TV program.

BRIEF DESCRIPTION OF THE DRAWINGS

Exemplary embodiments of the invention will now be described in more detail, and with reference to the accompanying drawings, in which.

DETAILED DESCRIPTION

In the following description, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it is apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

A concept of exemplary embodiments described hereinafter is a remote-controlled recording of selected linear media, e.g. a TV program, from a Media management server, e.g. an IPTV Backend, on a Recording device belonging to a first subscriber, hereinafter denoted Subscriber A. The recording is initiated from a User equipment belonging to another subscriber than said first subscriber, said another subscriber hereinafter denoted Subscriber B, wherein Subscriber B must be authorized by Subscriber A in order to access the Recording device. The authorization is checked by the Media management server, e.g. from a Friends list or Access list stored in the Media management server, or alternatively in an external social network node.

An above-mentioned Friends list corresponds to a listing of friends to a subscriber, i.e. associated other subscribers, the friends typically belonging to a social network of the subscriber. The Friends list may also indicate devices belonging to each friend in the list, e.g. a DVR and a PC. Further, according to embodiments described herein, a friend in the list may have previously authorized another subscriber to access one or more of his/her devices, and this authorization could also be stored e.g. in the Friends list, or in a separate Access list. This pre-stored authorization is available to the Media management server, e.g. within the server, or in a connected external social network node.

The Recording device may be a standardized DVR (Digital Video Recorder) or PVR (Personal Video Recorder), e.g. a set-top box with facilities for recording and playback, and the Recording device and the User equipment are both connectable to the Media Management server, e.g. via a local network.

According to an exemplary Use-case, Subscriber B browses the Media management server with his User equipment in order to display an EPG (Electronic Program Guide), and finds out from the EPG that BBC Prime Channel will show the TV program "Top Gear" on Tuesday at 10 o'clock in the evening. Subscriber B would like his friend, Subscriber A, to watch this TV program, but he also knows that Subscriber A will not be at home on Tuesday evening, and will not be able to watch Top Gear. Since Subscriber B has previously been authorized by Subscriber A to access a PVR belonging to Subscriber A, Subscriber B selects an option on his User equipment to remote-control a recording of Top Gear on the PVR belonging to his friend Subscriber A, and sends a corresponding command to the Media management server.

Then, Subscriber B receives a notification to his User equipment from the Media management server informing that Subscriber A does not subscribe to the BBC Prime Channel, and requesting Subscriber B to accept to pay for Top Gear. If Subscriber B accepts to pay, the Media management server will send a recording command to the PVR belonging to Subscriber A, with a viewing/play-out of the recorded content allowed. The PVR will detect and record Top Gear on Tuesday evening, and add a new entry in the EPG specifying the recorded Top Gear show. However, if Subscriber B does not accept to pay, the viewing of the recorded content will be locked, typically by storing the recorded content in an encrypted format, until Subscriber A pays himself.

Figure 1:
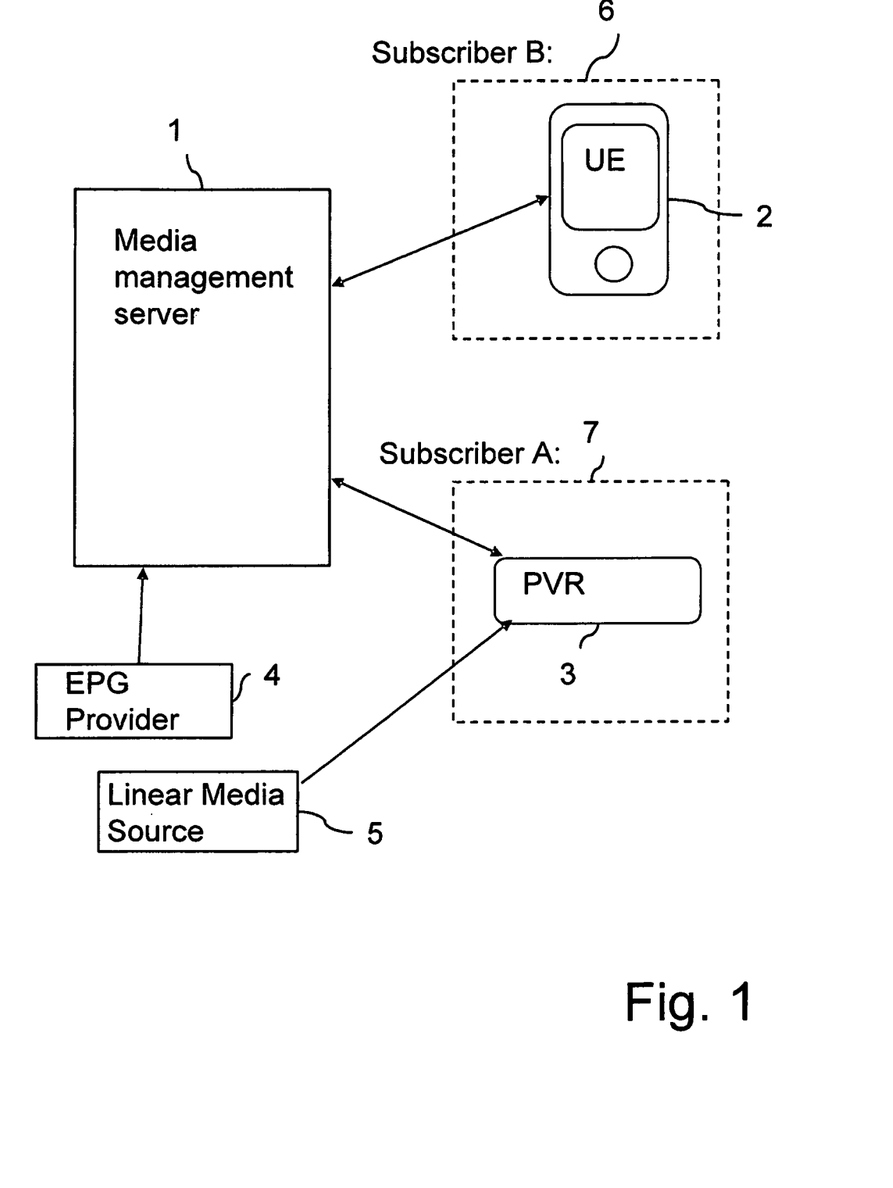
FIG. 1 schematically illustrates an exemplary architecture for remote-controlled recording.

FIG. 1 schematically illustrates an exemplary architecture for remote-controlled recording according to exemplary embodiments, showing a Media management server 1 connected to a User equipment 2 in a first local network 6, and to a Recording device 3 in a second local network 7, the User Equipment and the Recording device both provided with a gateway, typically a Set-top box (not illustrated in the figure). The User equipment and the Recording device belong to two different subscribers, which are denoted Subscriber B and Subscriber A, respectively, in the figure.

According to an exemplary embodiment, the Media management server 1 obtains a listing of available linear media, as well as the URLs to the respective media file, from an EPG-provider 4, typically a media content data server associated with one or more external media providers.

The User equipment 2 browses the Media management server 1 for obtaining and displaying the listing of the available linear media, i.e. the EPG, and receives a user-input selecting a linear media. Further, the User Equipment browses the Media management server for obtaining and displaying a listing, e.g. an above-described Friends list, of other subscribers belonging to the social network of the end-user of the User Equipment, i.e. friends to the end-user, and of devices belonging to each friend. The friends are all connected to the same operator as the end-user, and may have authorized the end-user to access one or more of their devices. According to an exemplary embodiment, the Friends list also indicates which of the devices belonging to each friend that the end-user is authorized to access. Alternatively, this authorization information is stored in an Access list in the Media management server that is not displayed to the end-user.

According to another exemplary embodiment, the Friends list and the Access list are stored in an external social network node connected to the Media management server (not illustrated in FIG. 1).

After receiving a user-input selecting a friend and a Recording device, the User Equipment sends a command to the Media management server 1 to record the selected linear media on a Recording device of a selected friend, the selected friend being another subscriber to the services of the same operator as the end-user of the User equipment.

The Media management server will check, e.g. in a Friends list or in an Access list stored within the server or in an external social network node, if the end-user of the User equipment is authorized to access the Recording device of the selected friend, and will send a recording command to the Recording device 3, if he/she is authorized.

When the Recording device 3 receives a recording command from the Media management server to record a selected linear media, it will retrieve and record the media stream from a Linear Media source, using e.g. an URL received with the command. The Linear Media source is e.g. an IPTV feed, and the media stream will be retrieved from the Media Source at the time of the broadcasting, which may be immediately after receiving the command, or after a time interval, e.g. a few hours or a few days.

According to another exemplary embodiment, the Media management server will also check if the selected friend subscribes to the channel showing the selected linear media, before sending a recording-command to the Recording device. If not, the Media management server will send a request to the initiating User equipment 2 to accept to be charged for the selected linear media. If the Media management server receives an accept from the User equipment, then the friend will get temporary access to the TV show, and will be able to view a play-out of the recorded TV show on a suitable play-out device, e.g. a TV (not illustrated in FIG. 1). However, if the request is rejected, the PVR will typically still record the TV show, but the viewing will be locked until payment is received, e.g. from the friend himself. The locking of the content typically involves a storing of the recorded content in an encrypted format.

Figure 2:
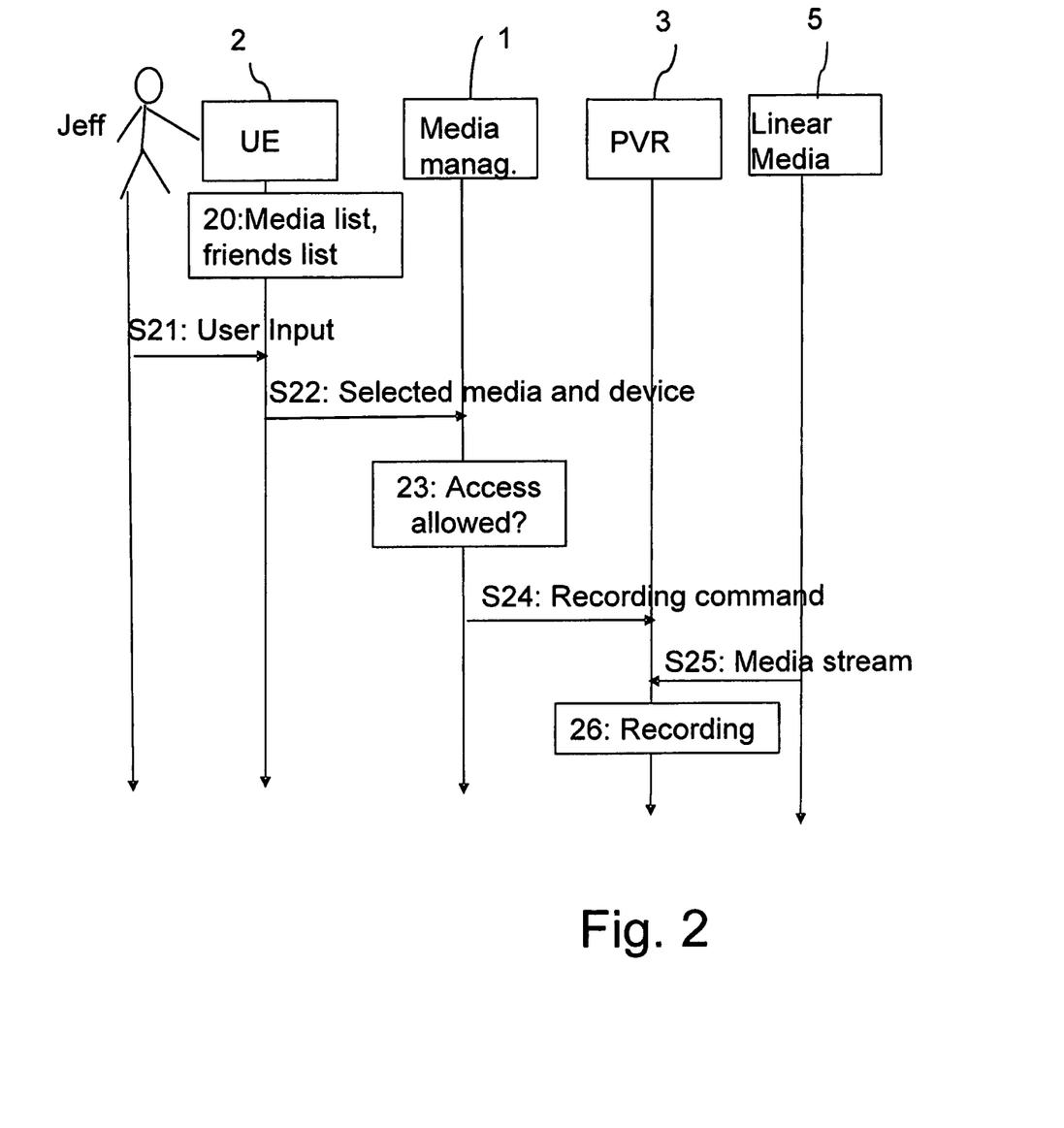
FIG. 2 illustrates an exemplary signalling diagram for the architecture in FIG. 1.

FIG. 2 is a signalling diagram illustrating an exemplary remote-controlled recording of a linear TV program on a PVR 3 (a Recording Device) from a Media management server 1, the recording being initiated from UE 2 (a User Equipment). According to the illustrated embodiment, the UE displays, in step 20, a listing of available linear TV programs and a Friends list. The end-user (Jeff) is able to select a TV program, as well an option to remote-control a recording on a PVR belonging to a selected friend, in a user-input to the UE, in signal S21, which is forwarded to the Media management server 1 as a recording command, in signal S22. When receiving the command, the Media management server checks, in step 23, if Jeff is authorized to access the PVR of his friend. If Jeff is authorized, then the Media management server sends a recording command, in signal S24, to the PVR 3 to record the selected TV program. In signal S25, the PVR receives the media stream of the selected TV program from a Linear Media source 5, and records the media, in step 26.

Figure 3:
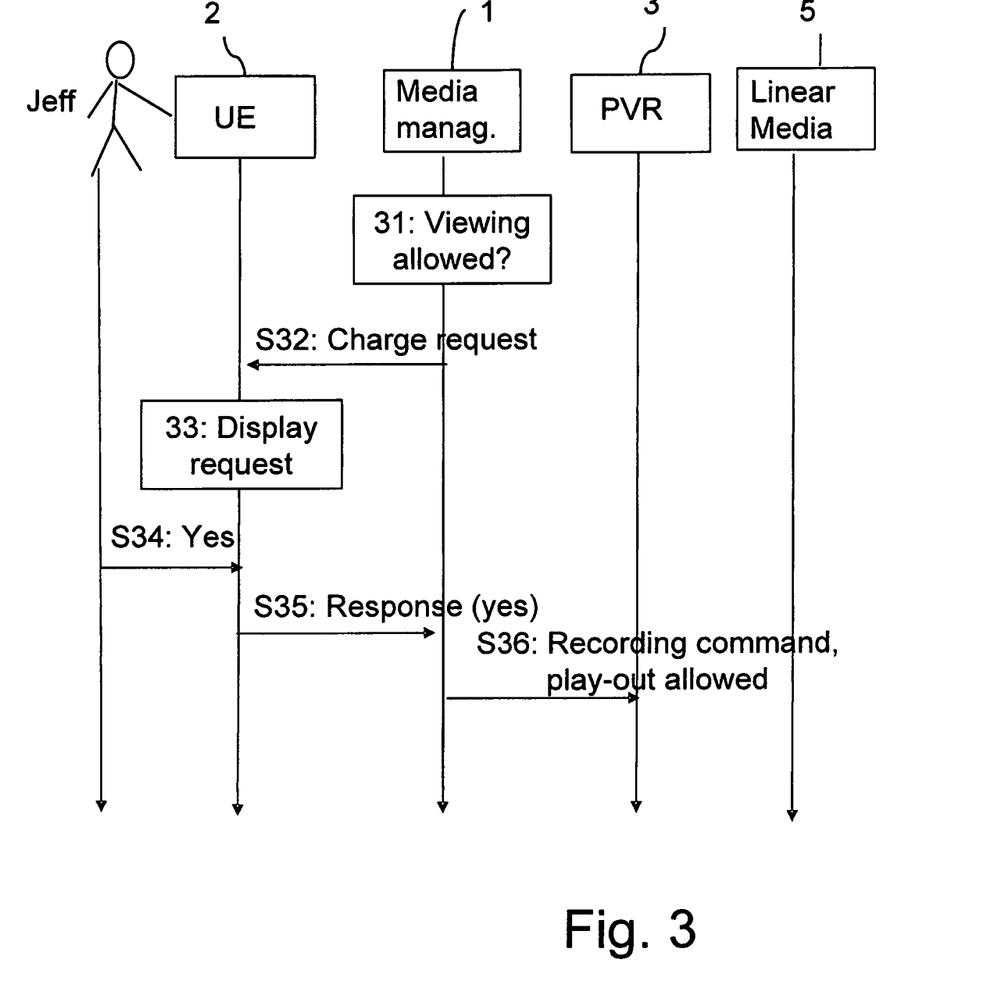
FIG. 3 illustrates a further exemplary signalling diagram.

FIG. 3 is a signalling diagram illustrating a further exemplary embodiment of a remote-controlled recording of a linear TV program on a PVR 3 from a Media management server 1, the recording being initiated from a UE 2. According to the illustrated embodiment, the Media management server checks, in step 31, if the selected friend subscribes to the TV program selected by Jeff, i.e. if the friend is allowed to play-out and view the TV program. This checking is done e.g. by contacting a Billing unit of the operator that may be located e.g. within the Media management server. If the friend does not subscribe to the TV program, then the Media management server notifies the UE, and requests that Jeff accepts to pay for the TV program, in signal S32, and the UE displays the request to Jeff, in step 33. If Jeff accepts to be charged, the UE receives a user input accepting the charge, and forwards an acceptance to the Media management server, in signal S35, and the Media management server sends a recording command to the PVR with a viewing allowed, in signal S36, i.e. with a play-out of the TV program allowed.

Figure 4:
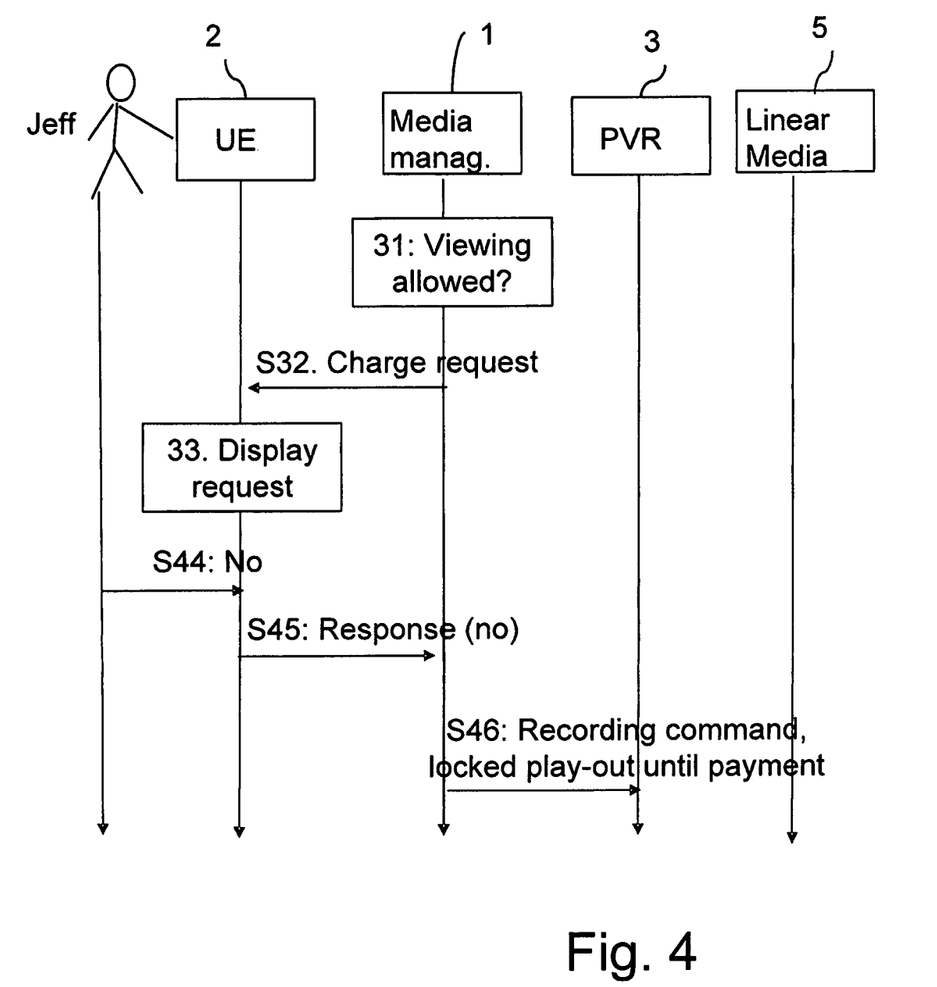
FIG. 4 illustrates an alternative exemplary signalling diagram.

FIG. 4 is a signalling diagram illustrating the exemplary embodiment according to FIG. 3, in case Jeff does not accept to be charged for the viewing. Similarly as in FIG. 3, the Media management server checks, in step 31, if the friend subscribes to the TV program selected by Jeff, i.e. if the friend is allowed to play-out and view the TV program. If the friend does not subscribe to the TV program, then the Media management server notifies the UE, and requests an acceptance of Jeff to pay for the TV program, in signal S32, and the UE displays the request to Jeff, in step 33. However, if Jeff does not accept to be charged, the UE receives a user input rejecting the request in signal S44, which is forwarded to the Media management server, in signal S45. In signal S46, the Media management server still sends a recording command to the PVR, but with a viewing not allowed, i.e. with the play-out of the TV program being locked, e.g. by the recorded media content being stored in an encrypted format, until a payment is received, e.g. from the friend or from Jeff.

Figure 5:
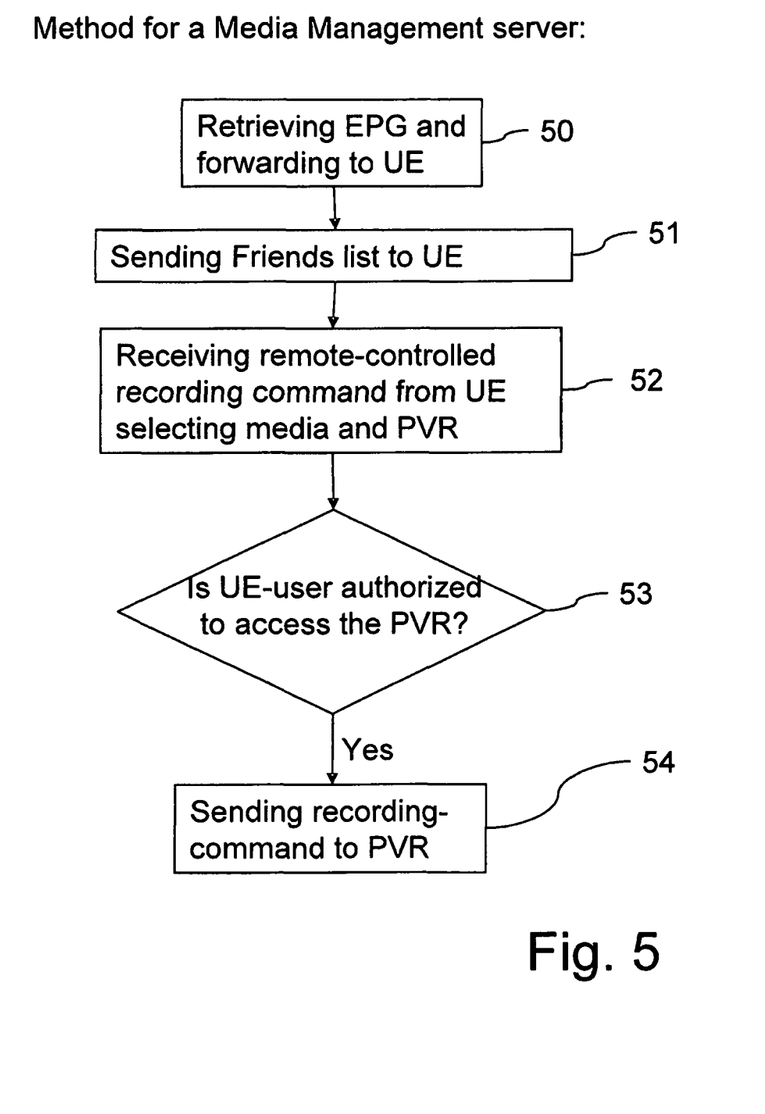
FIG. 5 is a flow diagram schematically illustrating an exemplary method for a Media management server.

FIG. 5 is a flow diagram illustrating an exemplary embodiment for a Media management server of remote-controlled recording of selected linear media on a Recording device belonging to a first subscriber, denoted Subscriber A, and wherein the recording is initiated by a User equipment belonging to another subscriber, i.e. the UE-user, denoted Subscriber B. In step 50, the Media management server retrieves a listing, e.g. an EPG, of available linear media, e.g. from an EPG provider, and forwards to the User Equipment browsing the Media management server. Further, in step 51, the Media management server sends a Friends List to the User equipment, the Friends List being a listing of other subscribers associated with Subscriber B, i.e., belonging to a social network of the end-user of the User equipment. Preferably, the Friends list also indicates the devices, e.g. a PVR, belonging to each friend in the list. In step 52, the Media management server receives a remote-controlled recording command from the User Equipment regarding a recording of a selected linear media on a Recording device belonging to a selected subscriber, i.e. Subscriber A, on the Friends List. Next, the Media management server determines, in step 53, if the end-user of the User equipment, i.e. Subscriber B, is authorized by Subscriber A to access the Recording device, e.g. from an internally stored Friends list or Access list, or alternatively from a Friends list or Access list stored in an external social network-node. If Subscriber B is authorized by Subscriber A, then the Media management server sends a recording command to the Recording device regarding a recording of said selected linear media. However, if Subscriber B is not authorized, then no recording command is sent to the PVR (not illustrated in FIG. 5.)

Figure 6:
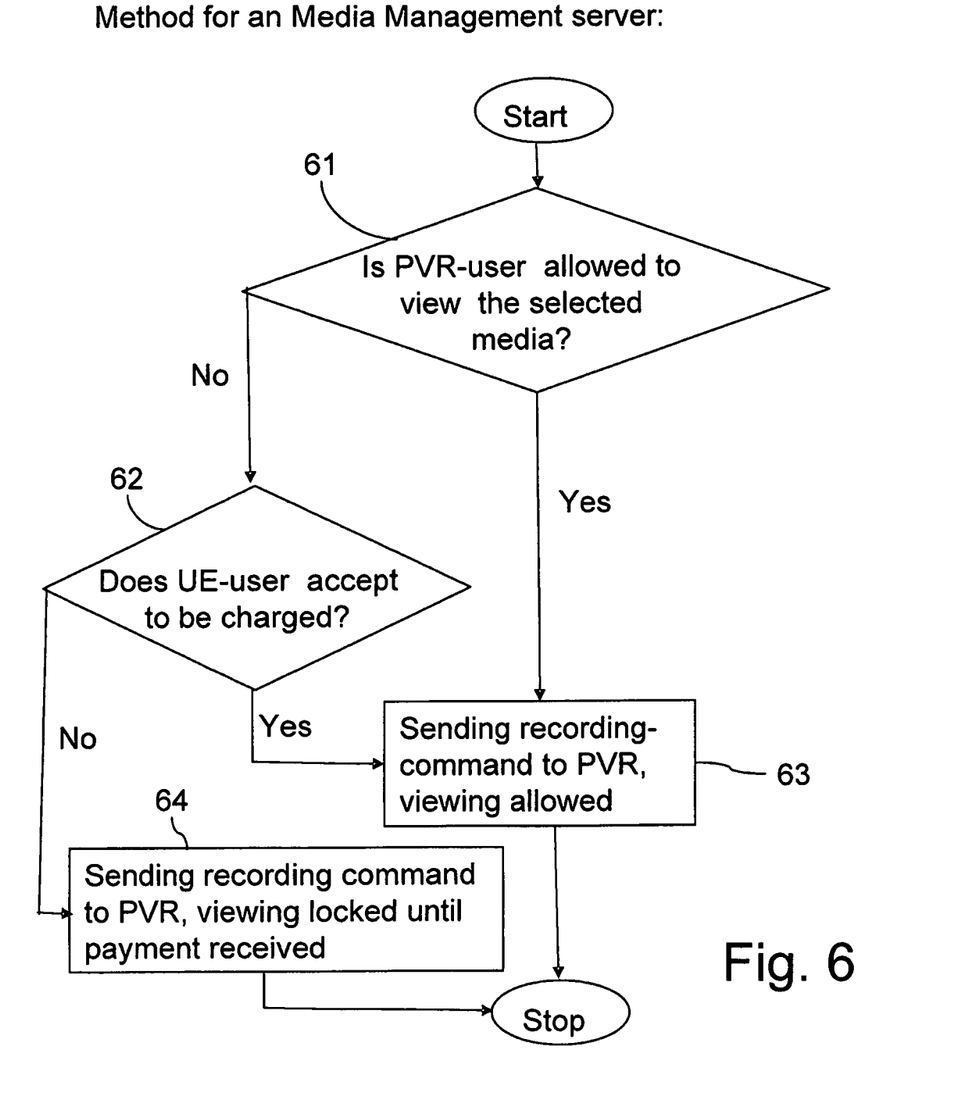
FIG. 6 is a flow diagram schematically illustrating a further exemplary method for a Media management server.

FIG. 6 is a flow diagram illustrating another exemplary embodiment for a Media management server of remote-controlled recording of selected linear media on a Recording device belonging to Subscriber A, the embodiment further comprising the Media management server determining, in step 61, if Subscriber A is allowed to view the selected linear media, e.g. subscribes to the channel showing the linear TV show. If he/she is allowed to view the media, then the Media management server directly sends a recording command, in step 63, to the recording device to record the selected linear media, the recording allowing a viewing, i.e. a play-out, of the recorded content. However, if he/she is not allowed to view the media, then the Media management server determines if the end-user of the User equipment, i.e. Subscriber B, accepts to be charged for the media, which is further illustrated in the previously described signalling diagrams 3 and 4. If he/she accepts to pay, Subscriber B will get temporary access to the media, and a recording command is sent to the Recording device, in step 63, to record the selected linear media, the recording allowing a viewing, i.e. a play-out, of the recorded content, e.g. on a TV connected to the Recording device. However, if Subscriber B does not accept to be charged for the media, then the Media management server sends a recording command, in step 64, to the PVR with the viewing, i.e. the play-out, being locked, until a payment has been received.

Figure 7:
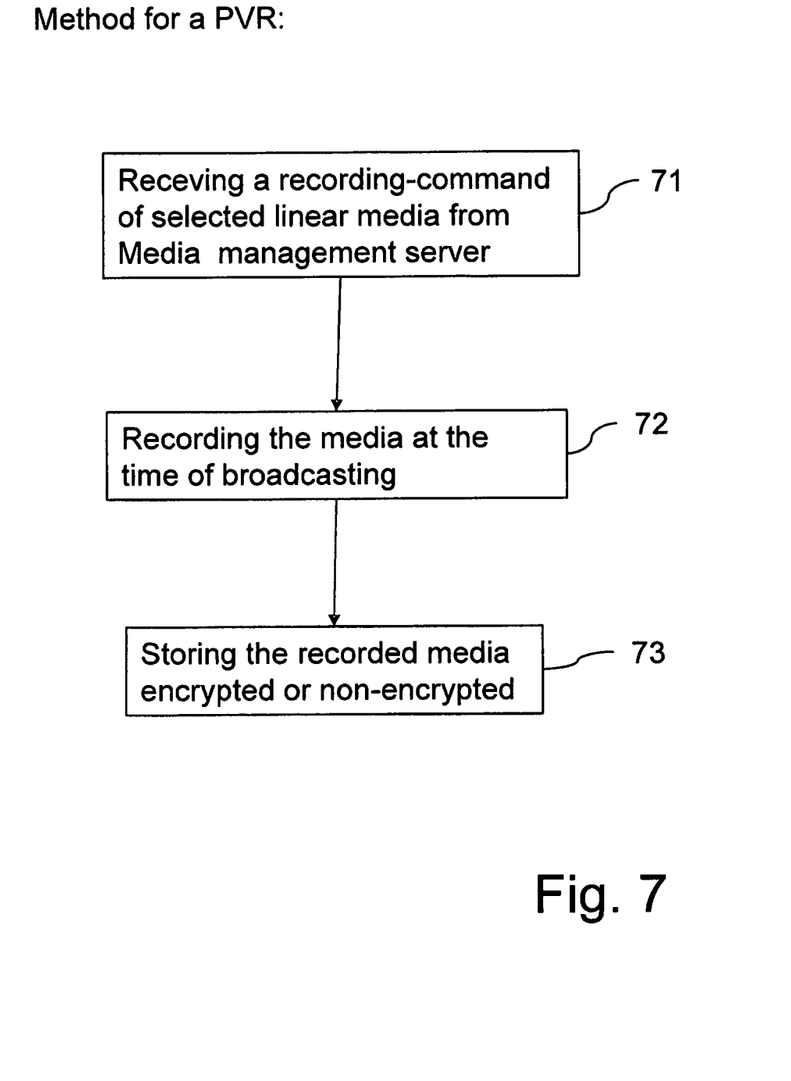
FIG. 7 is a flow diagram schematically illustrating an exemplary method for a Recording device.

FIG. 7 is a flow diagram illustrating an exemplary embodiment for a Recording device, e.g. a PVR or a DVR, of remote-controlled recording of selected linear media, wherein the recording is initiated by a User equipment belonging to a different subscriber than the Recording device. In step 71, the Recording device receives a recording command from the Media management server regarding a recording of linear media selected from the User equipment. In step 72, the Recording device receives the selected linear media, e.g. from a Linear Media source 5, at the time of broadcasting of the media, which may take place immediately, or after a time interval, e.g. of a few hours or a few days, and records and stores the linear media.

According to an exemplary embodiment, the Media management server has determined that the end-user of the Recording device, i.e. Subscriber A, does not subscribe to the channel sending the media, and that the end-user of the User equipment, i.e. Subscriber B, initiating the recording does not accept to pay for the media. In this case, the recording command received from the Media management server, in step 71, indicates that the recorded media should be locked for viewing, i.e. for play-out, until a payment has been done. Accordingly, the Recording device stores the recorded media content in an encrypted format, in step 73.

Alternatively, Subscriber B accepts to pay for the media. In this case, the recording command received from the Media management server in step 71 indicates that play-out of the recorded media is allowed, and the recorded content is stored an a non-encrypted format, in step 73.

According to another exemplary embodiment, the Media management server has determined that Subscriber A subscribes to the channel sending the media. In this case, the recording command received from the Media management server, in step 71, indicates that play-out of the recorded media is allowed, and the recorded content is stored in a non-encrypted format, in step 73.

Figure 8:
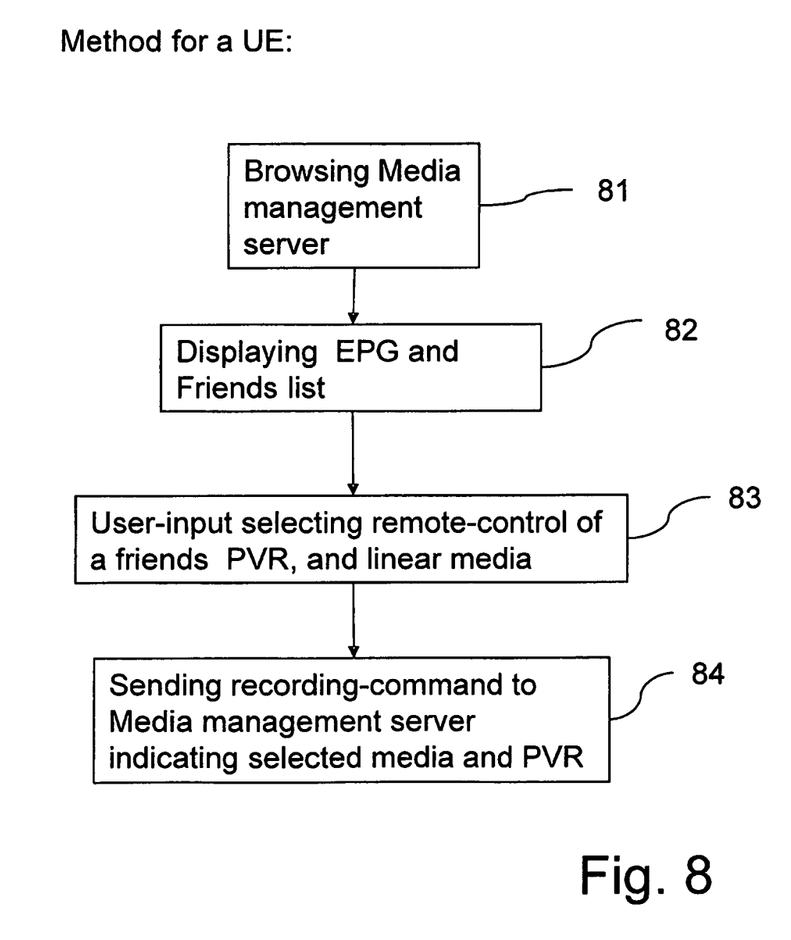
FIG. 8 is a flow diagram schematically illustrating an exemplary method for a User equipment.

FIG. 8 is a flow diagram illustrating an exemplary embodiment for a User equipment 2 of initiating a remote-controlled recording of selected linear media on a Recording device 3 belonging to a different subscriber than the User equipment. In step 81, the User equipment browses the Media management server 1 for receiving a listing of available linear media, e.g. from the EPG, and a Friends list indicating associated subscribers, i.e. belonging to a social network of the end-user of the User equipment. The Friends list typically also indicates devices belonging to each subscriber in the list. In step 82, the User Equipment displays the EPG and the Friends list, and receives a user-input indicating a recording of a selected linear media on a Recording device belonging to a selected friend/subscriber on the Friends list, in step 83. Next, in step 84, the User equipment forwards a remote-controlled recording command to the Media management server, indicating a recording of selected linear media on a Recording device of a selected friend, i.e. Subscriber A. If the Media management server then is able to determine that the end-user of the User equipment, i.e. Subscriber B, is authorized by the end-user of the Recording device, i.e. Subscriber A, to access the Recording device, e.g. from a Friends list or Access list stored internally in the server or in the external Social network node, the Media management server sends a recording command to the selected Recording device regarding a recording of said selected linear media.

According to another exemplary embodiment, the Media management server has determined, before sending a recording command to the Recording device, that the end-user of the Recording device, i.e. Subscriber A, does not subscribe to the channel sending the media. In this case, the User equipment receives a request from the Media management server to accept to pay for the media. The User equipment displays the request, and sends an acceptance or a rejection to the Media management server, depending on a received user input.

Figure 9:
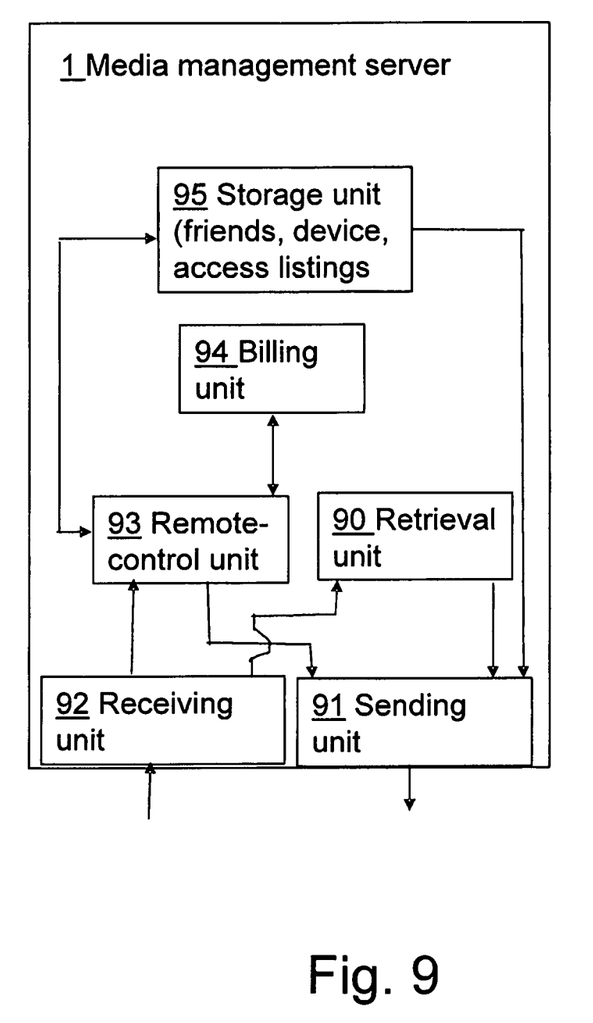
FIGS. 9 and 10 schematically illustrates an exemplary Media management server, and FIG. 11 schematically illustrates an exemplary recording device, e.g. a PVR or a DVR, and FIG. 12 schematically illustrates an exemplary User equipment.

FIG. 9 schematically illustrates an exemplary Media management server 1 that is connectable to a User Equipment 2 and to a Recording device 3 belonging to two different subscribers and being connected to the same or different network. The Media management server is also connectable to one or more media content data servers 4, associated with external media providers, e.g. with EPG providers. The Media management server is arranged to remote-control a recording of selected linear media on a selected Recording device 3, and the recording is initiated from a User equipment 2.

The illustrated Media management server comprises a Retrieval unit 90 for retrieving a listing of available linear media from the media content data server 4, a Sending unit 91 for sending the listing of available linear media, as well as a listing of associated subscribers, to the User equipment, a Receiving unit 92 for receiving a command from the User equipment regarding a remote-controlled recording of selected linear media on a selected recording device, and a Remote-control unit 93 for determining if the end-user of the User equipment is authorized by the end-user of the Recording device to access the Recording device. The Remote-control unit is further arranged to forward the recording command to the Recording device, if the end-user of the User equipment is authorized by the end-user of the Recording device to access the Recording device.

According to a further exemplary embodiment, the Media management server also comprises a Storage unit 95 for storing listings, e.g. Friends lists, of other subscribers associated with each subscriber, and the listing may also comprise devices belonging to each of the associated other subscribers. The storage unit may also be configured to store listings, e.g. denoted Access lists, of other subscribers that are authorized by the subscriber to access one or more of his/her devices.

Alternatively, the above-mentioned listings may be stored in a separate social network-node connected to the Media management server (not illustrated in the figure). In this embodiment, the Media management server is configured to retrieve the listings from the social network node.

According to another embodiment, the Media management server comprises a Billing unit 94 for determining if a subscriber subscribes to a selected media, and for charging a subscriber for a selected media.

The Media management server-node may comprise an IPTV Backend-functionality capable of delivering IPTV services to subscribers, and a Media Fabric-functionality capable of handling media content and media content metadata from media providers.

Figure 10:
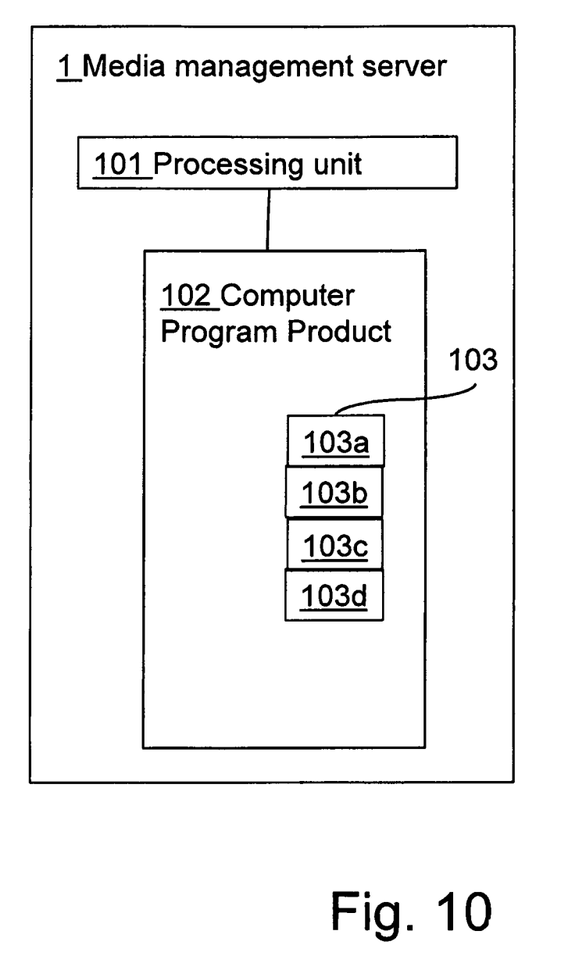

FIG. 10 schematically illustrates an embodiment of the Media management server, which is an alternative way of disclosing the embodiment illustrated in FIG. 9. The Media management server 1 comprises a processing unit 101 which may be a single unit or a plurality of units. Furthermore, the Media management server 1 comprises at least one computer program product 102 in the form of a non-volatile memory, e.g. an EEPROM (Electrically Erasable Programmable Read-Only Memory), a flash memory or a disk drive. The computer program product 102 comprises a computer program 103, which comprises code means which when run on the Media, management server causes the processing unit 101 to perform the steps of the procedures described earlier in conjunction with FIGS. 5 and 6.

Hence, in the embodiment illustrated in FIG. 10, the code means in the computer program 103 comprises a retrieving module 103a, a sending module 103b, a receiving module 103c and a remote-control module 103d. The modules 103a-103d essentially perform the steps of the flow in FIG. 5 to emulate the Media management server described in connection with FIG. 9. In other words, when the different modules 103a-103d are run on the processing unit 101, they basically correspond to the units 90, 91, 92, and 93 in FIG. 9, which are further explained above in connection with the description text associated with FIG. 9.

Although the code means in the embodiment disclosed above in conjunction with FIG. 10 are implemented as computer program modules which when run on the Media management server 1 causes the server to perform the steps described above in conjunction with FIG. 5, one or more of the code means may in alternative embodiments be implemented at least partly as hardware circuits.

Figure 11:
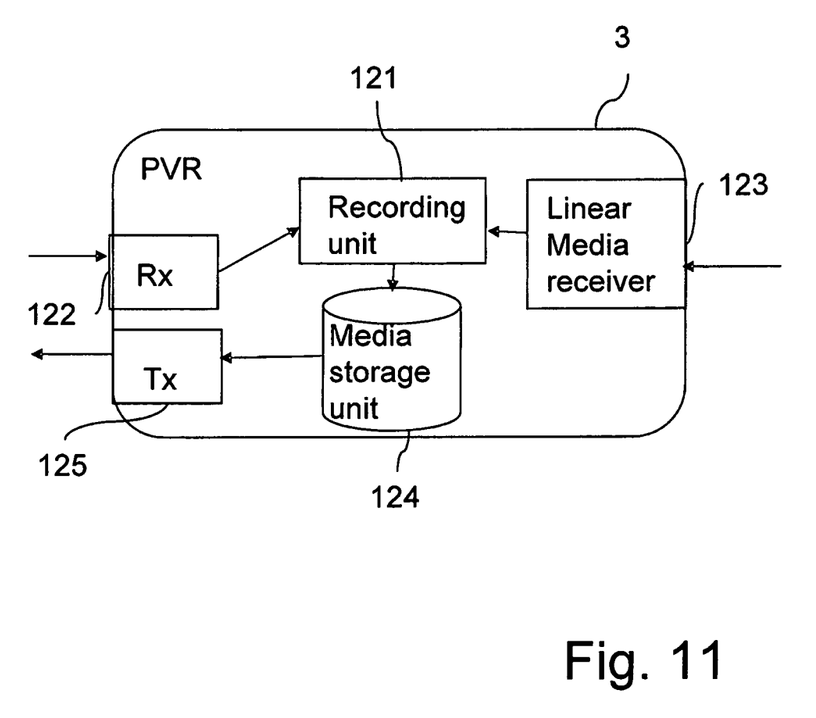

FIG. 11 describes an exemplary Recording device 3, e.g. a DVR or a PVR that is connectable to a Media management server 1, as illustrated in FIGS. 9 and 10. The Recording device is arranged to record linear media, wherein the recording is remote-controlled from the Media management server and initiated by a User equipment 2 belonging to a different subscriber than the Recording device. The Recording device comprises a Receiving unit 122 for receiving a command from the Media Management server to record a selected linear media, the linear media and the Recording device being selected from the initiating User equipment. The Recording device also comprises a Recording unit 121 for detecting and recording linear media at the time of broadcasting, and a suitable Processing unit (not illustrated in the figure.)

According to a further exemplary embodiment, the Recording device comprises a Linear media-receiver 123 for receiving a media stream from a Linear media source 5, e.g. an IPTV feed. It may further comprise a Media storage unit 124 with a conditional access, enabling a storage of recorded media in encrypted or non-encrypted format, depending on whether the end-user is allowed to view/play-out a stored media content or not. The Recording device also comprises a Sending unit 125 for sending non-encrypted recorded content to a play-out device.

The Recording device may be e.g. a Set-top box with recording and play-out facilities.

Figure 12:
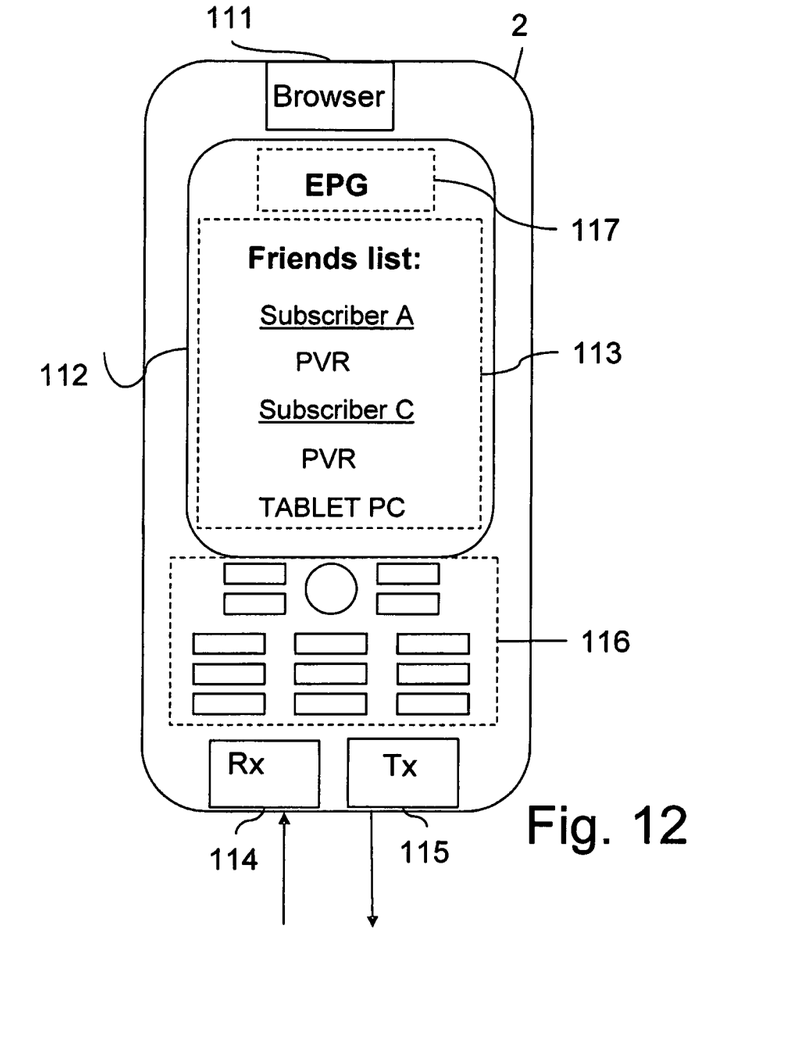

FIG. 12 illustrates an exemplary User equipment 2 connectable to a Media management server 1, as illustrated in FIG. 9. The User equipment is arranged to initiate a remote-controlled recording of selected linear media on a Recording device 3 belonging to a selected different subscriber, the recording being remote-controlled from the Media management server 1. The User equipment comprises a browsing unit 111 for browsing the Media management server in order to receive a listing, e.g. a conventional EPG (Electronic Program Guide) 117, of available linear media from a media content data server 4 associated with external media providers, and a Friends list 113 of associated subscribers (i.e. friends) from the Media management server, the Friends list 113 typically also indicating different devices belonging to each friend. The User equipment is also provided with a suitable Processing unit (not illustrated in the figure).

The User equipment also comprises a display unit 112 for displaying the EPG 117 and the Friends list 113, a User input unit 116 for receiving a User input, e.g. selecting linear media and a subscriber from the listings, and a Sending unit 115 for sending a command to the Media management server to record a selected linear media on a Recording device belonging to a selected friend. The User input unit 116 may comprise e.g. a touch screen, push-buttons or sensors.

According to a further exemplary embodiment, the User equipment comprises a Receiving unit 114, wherein the User equipment is configured to receive a request to accept to pay for a selected linear media. The User equipment is configured to display the request on the Display unit 112, to receive a user response to accept or reject the request on the User input unit 116, and to forward the response to the Media management server using the Sending unit 115.

The User equipment may be e.g. a mobile phone, a laptop, a PDA Personal Digital Assistant, or a remote-controlling unit for a PVR/DVR belonging to the end-user of the User equipment, i.e. not for the PVR/DVR arranged to perform the recording according to the embodiments described above.

Thus, it should be noted that the above-described Media management server 1, the Recording device 3 and the User equipment 2 may be implemented by physical or logical entities using software functioning in conjunction with a programmed microprocessor or general purpose computer, and/or using an application specific integrated circuit (ASIC). They may further include suitable internal and external storage devices, a processor or multiple processor cores, as well as appropriate communication interfaces, including hardware and software capable of performing the necessary modulating, coding, filtering and the like, as well as demodulating and decoding to process such signals.

However, the above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method for a Media management server of remote-controlled recording of selected linear media on a Recording device belonging to a selected Subscriber A, the recording being initiated by a User equipment belonging to Subscriber B, the method comprising:
   retrieving a listing of available linear media, and forwarding to the User equipment;
   sending a listing of subscribers associated with Subscriber B to the User equipment;
   receiving a command from the User equipment to remote-control the recording of the selected linear media on the Recording device belonging to the selected Subscriber A from the listing of subscribers associated with Subscriber B;
   determining if Subscriber B is authorized by the selected Subscriber A to remote-control the Recording device;
   sending a command to the Recording device to record the selected linear media, if Subscriber B is authorized; and
   determining if the selected Subscriber A has subscribed to the selected linear media or not, and sending a request to the User equipment belonging to Subscriber B to accept a charge for the selected linear media, if the selected Subscriber A has not subscribed to the selected linear media, wherein a play-out of the selected linear media recorded in the Recording device belonging to the selected Subscriber A is allowed, responsive to receiving an acceptance of the request from the User equipment belonging to Subscriber B.

2. The method according to claim 1, further comprising, responsive to receiving a rejection of the request from the User equipment belonging to Subscriber B, locking the play-out of the selected linear media recorded in the Recording device belonging to the selected Subscriber A until a payment is received.

3. A method for a User equipment connected to a Media management server of initiating a remote-controlled recording of selected linear media on a Recording device belonging to a selected Subscriber A, wherein the User equipment belongs to Subscriber B, and the recording is remote-controlled by the Media management server, the method comprising:
   browsing the Media management server for receiving and displaying a listing of available linear media, and a listing of associated subscribers;
   receiving a user-input of the selected linear media and the selected Subscriber A from the listing of available linear media and the listing of associated subscribers respectively;

sending a command to the Media management server to record the selected linear media on the Recording device belonging to the selected Subscriber A;

receiving and displaying a request from the Media management server to accept a charge for the selected linear media if the selected Subscriber A has not subscribed to the selected linear media;

receiving a user-input in response to the request, the user input indicating of the request; and sending a response based on the received user-input indicating acceptance or rejection of the request to the Media management server, wherein a play-out of the selected linear media recorded in the Recording device belonging to the selected Subscriber A is allowed, responsive to receiving the acceptance of the request from the User equipment belonging to Subscriber B.

4. A Media management server connectable to a Recording device belonging to a selected Subscriber A, and to a User equipment belonging to Subscriber B, the Media management server arranged to remote-control a recording of selected linear media on the Recording device, the recording being initiated from the User equipment, the Media management server comprising:

- a Retrieval unit that retrieves a listing of available linear media;
- a Sending unit that sends the listing of available linear media and a listing of subscribers associated with Subscriber B to the User equipment;
- a Receiving unit that receives a command from the User equipment to remote-control the recording of the selected linear media on the Recording device belonging to the selected Subscriber A from the listing of subscribers associated with Subscriber B;
- a Remote-control unit that determines if Subscriber B is authorized by the selected Subscriber A to access the Recording device, and sends a command to the Recording device to record the selected linear media, if Subscriber B is authorized by the selected Subscriber A to access the Recording device;
- a Billing unit that determines if the selected Subscriber A has subscribed to the selected linear media, and sends a request to the User equipment belonging to Subscriber B to accept a charge for the selected linear media, if the selected Subscriber A has not subscribed to the selected linear media, and the billing unit further allows a play-out of the selected linear media recorded in the Recording device belonging to the selected Subscriber A in response to receiving an acceptance of the request from the User equipment belonging to Subscriber B.

5. The Media management server according to claim 4, further comprising a Storage unit that stores a listing of other subscribers associated with Subscriber B, the listing comprising devices belonging to each of the other associated subscribers.

6. The Media management server according to claim 5, wherein the Storage unit further stores a listing of other subscribers that are authorized to access a device of Subscriber B.

7. The Media management server according to claim 4, that retrieves a listing of other subscribers, associated with Subscriber B, from a separate social network-node connected to the Media management server.

8. The Media management server according to claim 4, that retrieves a listing of other subscribers that are authorized to access a device of Subscriber B, from a separate social network-node connected to the Media management server.

9. A User equipment connectable to a Media management server and arranged to initiate a remote-controlled recording of selected linear media on a Recording device belonging to a selected other subscriber, the recording being remote-controlled from the Media management server, the User equipment comprising:

- a Browsing unit that browses the Media management server for receiving a listing of available linear media, and a listing of associated other subscribers;
- a Display unit that displays said listings;
- a User-input unit that receives a user input selecting a linear media and an associated subscriber from the listing of available linear media and the listing of associated other subscribers respectively;
- a Sending unit that sends a command to the Media management server to record the selected linear media on the Recording device belonging to the selected other subscriber, and wherein the User equipment further receives and displays a request from the Media management server to accept a charge for the selected linear media if the selected other subscriber has not subscribed to the selected linear media, receives a user input in response to the request, wherein the user input indicating acceptance or rejection of the request, and sends a response based on the received user-input indicating acceptance or rejection of the request to the Media management server, wherein a play-out of the selected linear media recorded in the Recording device belonging to the selected other subscriber is allowed, responsive to receiving the acceptance of the request from the User equipment.

10. The Media management server according to claim 4, wherein the billing unit further locks the play-out of the selected linear media recorded in the Recording device belonging to the selected Subscriber A until a payment is received.

* * * * *